United States Patent [19]

Ritter

[11] 4,383,924
[45] May 17, 1983

[54] TREATMENT OF WATER, ESPECIALLY WATER FOR AQUARIA

[75] Inventor: Günter Ritter, Melle, Fed. Rep. of Germany

[73] Assignee: Tetra Werke Dr. rer. nat. Ulrich Baensch Gesellschaft mit beschränkter Haftung, Melle, Fed. Rep. of Germany

[21] Appl. No.: 194,022

[22] Filed: Oct. 6, 1980

Related U.S. Application Data

[63] Continuation of Ser. No. 36,234, May 4, 1979, abandoned.

[30] Foreign Application Priority Data

May 5, 1978 [DE] Fed. Rep. of Germany ....... 2819636

[51] Int. Cl.³ .............................................. C02F 1/42
[52] U.S. Cl. .................................... 210/662; 210/688
[58] Field of Search ............... 210/282, 681, 682, 687, 210/688, 263, 662, 169; 521/25

[56] References Cited

U.S. PATENT DOCUMENTS 2,653,089 9/1953 Brooke ............................ 210/688
2,749,307 6/1956 Ellison ............................ 210/282
3,347,211 10/1967 Falkenberg et al. ................. 210/169
3,788,982 1/1974 Zsoldos et al. ...................... 210/169

FOREIGN PATENT DOCUMENTS 2221545 11/1973 Fed. Rep. of Germany .

OTHER PUBLICATIONS

Kunin, R., Ion Exchange Resins, N.Y., R. E. Krieger, 1972, pp. 113-114.

*Primary Examiner*—Ivars C. Cintins
*Attorney, Agent, or Firm*—Becker & Becker, Inc.

[57] ABSTRACT

Treatment of water for selective and quantitative removal of all cations of the transition elements, with simultaneous adjustment of a definite mole ratio of calcium, magnesium, and the alkali metals, with a cation exchanger which, towards the ions of the I. transition elements, II. alkaline earth metals, III. alkali metals, shows a markedly gradually decreasing affinity from I. to III.; and which cation exchanger is loaded with calcium and magnesium ions in a predetermined mole ratio, or with hydrogen or sodium ions to obtain a water corresponding to the desired type of water in a vessel made of a water-resistant material and having at least one water-permeable wall.

7 Claims, No Drawings

TREATMENT OF WATER, ESPECIALLY WATER FOR AQUARIA

This is a straight continuation application of now abandoned parent Ser. No. 36,234-Ritter filed May 4, 1979, being based on German patent application Ser. No. P28 19 636.3 filed May 5, 1978 as claimed for priority under 35 USC 119.

The present invention is concerned with a process for the treatment of water and especially of water for aquaria.

Fish and other aquatic organisms, especially aquarial fish and those organisms which originate from tropical waters can only multiply when their living conditions are substantially adapted to their natural environments. Besides the temperature, which is easy to regulate, the composition of the water and especially of water in aquaria is of decisive importance not only for the health but also for the well-being of animals and plants, as well as for successful breeding.

It is known that certain cations can exercise an aggressive action on the mucous membranes and gills of fish and it has been suggested that these metal ions be converted into chelate complexes by means of ethylenediaminetetraacetic acid (EDTA). In this manner, a certain degree of "detoxication" of aquarial water can, indeed, be achieved which permits any desired tap water to be treated in such a manner that even sensitive aquarial fish can be placed therein without a comparatively long accustoming period. Nevertheless, the desired degree of success was not always achieved even when EDTA was added in an amount which sufficed for masking all the toxic metal ions present and especially the ions of the transition elements. In the case of widely varying contents of metal in the water, this is especially problematical.

We have found that the reason lay in the bioavailability of the disturbing metal ions remaining in spite of the masking which had an especially negative effect in the case of very sensitive kinds of fish and can completely prevent successful breeding.

We have also found that many kinds of fish are not only sensitive to the absolute value of the total hardness of the water, i.e. react to the total concentration of magnesium and calcium ions, but that, surprisingly, the presence of the correct mole ratio of the calcium and magnesium ions is of decisive importance. Furthermore, the carbonate hardness and the pH value of the water play an important part.

A precise adjustment of the above-mentioned parameters and the selective removal of toxic trace elements was previously outside the scope of the aquarist, quite apart from the fact that their outstanding importance for the well-being and health of the animals in aquaria had not hitherto been appreciated.

It is an object of the present invention to treat water and especially water for aquaria in such a manner that its composition corresponds to that of the natural environment in such a manner that optimum living conditions are provided for plants and animals living in the water.

This object and other objects and advantages of the invention will appear more clearly from the following specification.

We have found that certain cation exchange resins are capable of forming especially stable transitional metal complexes and are, therefore, ideally suited for the selective removal of toxic trace elements and, with simple means, of producing and maintaining aquarial water of any desired natural ion composition. The composition of the water can hereby be precisely adjusted to the requirements of the types of fish living therein, without having to use additives which do not occur in natural waters.

The ion exchangers which can be used according to the present invention are described in the monograph "Chelatbildende Ionenaustauscher" by R. Hering, pub. Akademie Verlag, Berlin, 1967, especially preferred resins being the IDE resins described on page 36 et seq. of this monograph, for example those which contain polyvinyl-N-benzyliminodiacetic acid groups as complex formers.

The favorable properties of the ion exchangers to be used according to the present invention depend upon their varying affinity for hydrogen ions, alkali metal ions, alkaline earth metal ions and the ions of the transition metals.

These ion exchangers possess an especially high affinity towards the transition metal ions, for example, zinc, cadmium, mercury, copper and iron ions. Their affinity to magnesium and calcium ions is smaller but still relatively strong, whereas with alkali metal ions and especially with sodium ions, only very loose associated bonds are formed. This special graduation of affinity permits:

(1) removal of traces of transition metals with and without influencing the other ions present;
(2) influencing the total hardness by increasing or decreasing the concentration of magnesium and calcium ions, as well as displacing the $Mg^{++}/Ca^{++}$ ion ratio; and
(3) changing the sodium and potassium ion concentration or displacing the sodium/potassium ion ratio.

It is known that the trace element concentration and thus, in particular, the transition metal concentration of natural water is normally very small. In sweet waters, the sum of all transition metal ion concentrations is in the range of from 0.5 to 1.0 $\mu$Mol/liter and in sea water has a maximum of about 0.5 $\mu$Mol/liter. All organisms living in aquaria are adapted to these very low concentrations. Therefore, they can only tolerate with difficulty or only for a short period of time concentrations which differ very greatly therefrom and especially substantially higher concentrations.

The basis of all aquarial water is, in the end, tap water which, possibly for changing the "macroscopic" parameters, for example pH value, total hardness, carbonate hardness and/or total salt content, is appropriately treated. However, the transition metal content is hereby influenced to an appreciable extent and the ion ratios cannot be displaced in the desired direction.

The still permitted limiting concentrations of the most important transition metals, such as zinc, copper, iron, cadmium and mercury, in drinking water, laid down by the World Health Organization (WHO), are, with a total of about 80 to 1000 $\mu$Mol/liter, so high that the toxic limits for the organisms in question are, as a rule, far exceeded in aquaria.

The transition metal concentrations which are actually met vary considerably and usually lie below the WHO limiting values but sometimes are considerably higher.

In addition to the total concentration of the transition metals, which frequently already act toxically, there is also the fact that the mole ratios of some metal ions, such as copper:zinc, often differ very considerably from the mole ratios present in natural waters. This leads to further complications, with negative physiological effects. The content of transition metals which are to be found in tap and other fresh water, for example spring water, lead to corresponding damage which, although perhaps not acute, is, however, always of a chronic nature in the case of fish and lower animals; algae and higher plants; and micro-organisms.

Hitherto, it was also not appreciated that especially the damage to the micro-organisms necessary for biological self-purification resulted in correspondingly impaired water conditions, the consequently non-decomposed organic molecules, for example amines and/or phenols, as well as inorganic molecules, for example ammonia or nitrite anions, thereby resulting in further and additionally negative influences on fish and other organisms.

Therefore, it is important completely to remove toxic trace elements, whereby, however, ions essential for plants, for example, iron, zinc or cobalt ions, can subsequently be added again to the desired amount, possibly in a protected and/or stabilized form.

Hitherto, a selective removal of the disturbing trace elements was not possible since, due to the use of conventional ion exchangers, the content of calcium and magnesium ions is simultaneously changed in an undesirable manner.

We have found that the ions of the transition metals can be removed selectively and quantitatively when water is treated with an ion exchanger of the above-described type.

In principle, it is immaterial whether the ion exchanger used is present in its $H^+$ form or whether it is loaded with alkali metal or alkaline earth metal ions. However, the final and desired composition of the water can be precisely predetermined and controlled by the loading of the resins.

Even when fresh water has been treated according to the present invention and made usable for aquarial purposes, it is still necessary to keep the transition metals out of the water even in the case of a continuous use of the aquarium. Under normal circumstances, this cannot be ensured since toxic metal ions can be continuously liberated from the material on the bottom of the aquarium, from decorative materials present therein and from tank materials, for example in the case of tanks comprising frames or from filter materials.

Furthermore, foodstuffs, products from animal excrement and decomposition products of micro-organisms, as well as decomposition products from plant or other biological material, are all potential sources of transition metal ions.

Our own investigations have shown that, especially in the case of sea water aquaria, there is a tendency towards gradually increasing the transition metal concentrations. Depending upon the degree of occupancy of the aquaria, concentrations of about 5 to 6 $\mu$Mol/liter are gradually formed, which means at least ten times the natural concentration.

It follows from this that, contrary to the previously held expert opinion, a continuous supply of trace elements to aquarial water is not necessary but rather the continuous removal of free transition metal ions must be aimed for in order to achieve a very low level of concentration corresponding to the natural conditions.

If, for example, an ion exchanger is used which is loaded with calcium and magnesium ions in a particular ratio, then, due to the graduated affinity of the exchanger, trace elements are completely removed and calcium and magnesium ions are exchanged until the desired mole ratio, in the case of a predetermined total concentration, is achieved, it being possible to start from the assumption that the concentrations of the anions of the trace elements do not play a substantial part. On the other hand, the content of alkali metal ions remains uninfluenced.

In accordance with the present invention there is provided a process for treating water for selective and quantitative removal of cations of the transition elements and simultaneously adjustment to a predetermined mole ratio of calcium, magnesium and the alkali metals, the process comprising the steps of loading a cation exchanger which, towards the ions of the I. transition elements, II. alkaline earth metals, III. alkali metals, shows a markedly gradually decreasing affinity from I. to III.; and treating water with the loaded cation exchanger.

Thus, according to one aspect of the present invention, there is provided a process for the treatment of water, with a selective and quantitative removal of all cations of the transition elements and with the simultaneous adjustment of the definite mole ratio of calcium, magnesium and the alkali metals, wherein water is treated with a cation exchanger which, towards the ions of I. transition elements, II. alkaline earth metals, III. alkali metals, shows a markedly gradually decreasing affinity from I. to III. and which resin is loaded (a) when water is desired corresponding to a normal sweet water, with calcium and magnesium ions in a mole ratio of 200:1 to 1:10; or (b) when water is desired corresponding to a tropical water with a small total and carbonate hardness, with hydrogen ions; or (c) when water is desired with a low total hardness but with a high carbonate hardness, with sodium ions; or (d) when water is desired corresponding to sea water, with calcium and magnesium ions in a mole ratio of 1:1 to 1:2.

Especially desirable in the case of (a) is the ratio of from 35:1 to 1:3 and in the case of (d) the ratio of 1:1.6 since these ranges come closest to the physiological conditions of the corresponding natural water.

However, in exceptional cases, it is possible, at any time, to adjust quite extreme mole ratios, for example a Ca/Mg mole ratio of from 100:1 to 1:100 and beyond.

A Ca/Mg ratio of 1:10 means, for example, that there are 10 magnesium ions present for each calcium ion.

The present invention also provides a cation exchanger which has a markedly gradually decreasing affinity to the cations of the I. transition metals;
II. alkaline earth metals;
III. alkali metals,
said resin being loaded with calcium and magnesium ions in a mole ratio of 200:1 to 1:10.

As a rule, the Ca/Mg ion ratio varies in the case of aquarial waters between 1:6 (sea water) and 7:1 (sweet water). The average sweet water determined from all over the world has a ratio of 2.2:1, the precise ion ratio in salt water from the oceans being 1:5.561.

If, for example, tap water with a high content of zinc, cadmium and/or copper and with a Ca/Mg ratio of 10:1 is treated with an ion exchanger adjusted to normal sweet water (ion ratio 2.2:1), then the trace elements are completely removed and so many calcium ions are exchanged for magnesium ions that a water is obtained with the natural alkaline earth metal mole ratio of about 2.2:1.

A calculated correlation of the Ca/Mg mole ratio of water and exchange resin under equilibrium conditions is not readily obtainable. Simple experimental series in which the equilibrium adjustment of a cation exchanger, for example of the N-benzyliminodiacetic acid type, with waters which contain calcium and magnesium ions in different mole ratios, are given in the following table I:

TABLE I

| Ca/Mg mole ratio in the water | Ca/Mg mole ratio in the cation exchanger |
| --- | --- |
| 10:1 | 29.00:1 |
| 8:1 | 23.00:1 |
| 6:1 | 18.00:1 |
| 4:1 | 12.00:1 |
| 2:1 | 6.00:1 |
| 1:1 | 3.30:1 |
| 1:2 | 1.70:1 |
| 1:4 | 0.90:1 |
| 1:6 | 0.63:1 |
| 1:8 | 0.47:1 |
| 1:10 | 0.38:1 |

From the Table it can be deduced which state of loading (Ca/Mg ratio) must be possessed by the ion exchanger to be used in order to obtain or maintain a desired Ca/Mg mole ratio in the water.

Intermediate values which are not given in the Table can either be estimated, with the usually achievable exactitude, by extrapolation or, if extreme exactitude is desired, can be deduced from a double logarithmic graphical plot.

If resins are used with other chelate-forming functional groups, then, by means of experimental series, new correlation data must be determined by simple serial experiments, which, for the expert, does not involve any technical problems.

The production of the resins according to the present invention (resins loaded with calcium and magnesium with a desired Ca/Mg mole ratio) can, in principle, take place in two different ways:

(a) After determining the loading capacity, there is prepared, in known manner, not only the calcium form but also the magnesium form, for example from the $H^+$ form and calcium hydroxide and magnesium carbonate or from the disodium form and calcium and magnesium ions. By mixing appropriate amounts of the calcium and magnesium forms, there can be obtained the resin with the desired Ca/Mg loading ratio.

(b) on the basis of the correlation Table, the resin in the $H^+$ form or in the mono- or disodium form can be equilibrated with a large excess of a solution, the Ca/Mg ion ratio of which corresponds to the desired loading state, the Ca/Mg ion ratio thereby being kept constant, possibly by the addition of calcium or magnesium ions. In order to maintain a pH value of from 6 to 8, it may be necessary to add an appropriate buffer solution.

The process according to the present invention enables even the frequently more extreme living conditions of certain types of tropical fish to be reproduced without difficulty.

There are, for example, fish which live in water with an extremely low total hardness and, at the same time, with a low carbonate hardness. The composition of this water is achieved when, according to the present invention, there is used an exchanger in the $H^+$ form. Besides the removal of the toxic trace elements, the calcium and magnesium ions are also exchanged to a substantial extent by hydrogen. If the solubility product of carbonic acid is hereby exceeded, gaseous carbon dioxide either escapes or is assimilated by aquarial plants. There is thus obtained an extremely soft aquarium water which is free of toxic heavy metals and corresponds precisely to the environment of certain types of tropical fish.

However, this process can only be readily used when the carbonate hardness is greater than or equal to the total hardness.

Thus, if the total hardness is greater than the carbonate hardness, then the amount of exchanger must first be measured in such a manner that its capacity is, at most, equivalent to the carbonate hardness. Only then can all the liberated protons still be captured.

If the resin capacity is greater than the carbonate hardness equivalent, then the protons liberated because of the great affinity of the resin for calcium and magnesium ions could lead to a dangerous decrease in the pH value since all bases were, of course, previously protonised. Thus, in the case of the use of this process, the pH value must be monitored and correspondingly controlled by the addition of bases.

Other kinds of fish live in water with a low total hardness but an extremely high carbonate hardness, for example in Lake Malawi or Lake Tanganyika. Such water contains a high proportion of sodium carbonate so that its pH value lies markedly in the alkaline range. The composition of such alkaline water is achieved by the use of exchangers in the sodium form. Since the exchangers for calcium and magnesium ions compared with sodium ions possess a strong affinity, these are rapidly exchanged for sodium ions.

The exchanger can be brought into contact with the water in known manner. Thus, for example, it is possible to use columns filled with the exchanger through which flows water for the aquarium, these columns being placed inside or outside of the aquarium.

Since, however, the ion exchangers used according to the present invention have a high affinity for divalent ions and especially for those of the transition group of metals, an equilibrium is quickly obtained when the exchanger is placed in a water-permeable container and simply suspended in the aquarium. In this case, the movement of water present in the aquarium is sufficient for the ion exchange.

This "batch process" is something new in the field of aquaria and is extremely advantageous because it is possible to do away with pipes, pumps and accessories which are otherwise needed. Furthermore, this process offers the advantage that the desired changes in an aquarium take place slowly and in a physiologically acceptable manner so that the organisms affected, such as fish, micro-organisms and plants, are introduced to the changed environmental conditions without shock.

The resin mixture hereby acts as a sponge for the ions which it takes up because of its great affinity.

Therefore, the present invention also provides a vessel for treating water, which vessel is made of a water-resistant material and having at least one water-permeable wall and containing a cation exchanger according to the present invention, the amount of exchanger corresponding stoichiometrically to a definite ion exchange activity.

Water treated according to the present invention is, of course, especially useful everywhere where physiological requirements must be taken into account. Thus, for example, water with a low content of calcium and magnesium and with a slightly acidic pH value is very useful for cultivating orchids, araceae as for example pineapples and peanuts, the water being there especially useful not only for watering but also for spraying the plants. In this case, too, it is merely necessary to hang in a watering can a small water-permeable vessel containing the exchange resin by means of which fresh water is treated in the time up to the next watering.

Sometimes it is not possible to achieve the optimum composition of the water only by ion exchange. In this case, after the exchange, there is added a definite amount of the missing ions, for example, for plants, essential trace elements or sodium carbonate.

The present invention is, of course, in no way restricted to the specific disclosure of the specification, but also encompasses any modifications within the scope of the appended claims.

What I claim is:

1. A batch process for treating tap water in an aquarium wherein the tap water contains transition element cations, calcium and magnesium in order to remove completely all traces of the transition elements and to adjust the equilibrium of calcium, magnesium and alkali metal ions to a desired mole ratio to thereby convert the tap water to water specifically suitable for aquarium water into which living organisms can be introduced without shock, the method comprising the steps of:

measuring the calcium/magnesium ion mole ratio of the tap water in the aquarium;

comparing the calcium/magnesium ratio to the desired ion mole ratio;

loading a unitary cation exchanger containing a resin treated to have a strong affinity for transition elements with calcium and magnesium ions with a calcium/magnesium mole ratio in the cation exchanger which ratio decreases as the desired calcium/magnesium mole ratio of the tap water in the aquarium decreases to provide an exchanger with a calcium/magnesium mole ratio selected to achieve the desired mole ratio in the tap water, which exchanger has a relatively great affinity for transition elements, a lesser affinity for alkaline earth elements and a still lesser affinity for alkali metals, and thereafter simultaneously removing the transition elements and achieving the desired calcium/magnesium ratio of the tap water in the aquarium by the single step of immersing the loaded cation exchanger in the aquarium containing the tap water.

2. A batch process in combination according to claim 1 wherein the desired ratio is that of sweet water, said loading of the cation exchanger is with calcium and magnesium ions in the mole ratio range of 200:1 to 1:10 to obtain tap water corresponding to a desired normal sweet water.

3. A batch process in combination according to claim 2, wherein the calcium/magnesium ratio is in the range of from 35:1 to 1:3.

4. A batch process in combination according to claim 1, wherein said loading of the cation exchanger further includes loading the cation exchanger with hydrogen ions to obtain water corresponding to a tropical water with small total and carbonate hardness.

5. A batch process in combination according to claim 1, wherein said loading of the cation exchanger further includes loading the cation exchanger with sodium ions to obtain water with a low total hardness but with a high carbonate hardness.

6. A batch process in combination according to claim 1, wherein the desired ratio is that of sea water and said loading of the cation exchanger is with calcium and magnesium ions in the mole ratio of 1:1 to 1:2 to obtain tap water corresponding to sea water.

7. A batch process in combination according to claim 6, wherein the calcium/magnesium ratio is 1:1.6.

* * * * *